United States Patent
Morii (10) Patent No.: US 7,007,657 B2
(45) Date of Patent: Mar. 7, 2006

(54) DRIVE MECHANISM FOR FOUR-CYCLE ENGINE

(75) Inventor: Hideshi Morii, Shizuoka (JP)

(73) Assignee: Suzuki Motor Corporation, Hamamatsu (JP)

( * ) Notice: Subject to any disclaimer, the term of this patent is extended or adjusted under 35 U.S.C. 154(b) by 370 days.

(21) Appl. No.: 10/618,420

(22) Filed: Jul. 11, 2003

(65) Prior Publication Data

US 2005/0257984 A1  Nov. 24, 2005

(30) Foreign Application Priority Data

Oct. 29, 2002  (JP) .............................. 2002-314677

(51) Int. Cl.
*F02F 7/00* (2006.01)
(52) U.S. Cl. .................................................. 123/197.1
(58) Field of Classification Search ............. 123/197.1, 123/197.4
See application file for complete search history.

(56) References Cited

U.S. PATENT DOCUMENTS

| | | | | | |
|---|---|---|---|---|---|
| 5,259,347 | A | * | 11/1993 | Kobayashi et al. ....... | 123/197.1 |
| 5,279,381 | A | * | 1/1994 | Fukuda ....................... | 180/190 |
| 5,372,215 | A | * | 12/1994 | Fukuda ....................... | 180/190 |
| 2001/0039934 | A1 | * | 11/2001 | Ohmberger et al. .... | 123/195 A |
| 2002/0043237 | A1 | * | 4/2002 | Nomura et al. ......... | 123/196 R |
| 2005/0028761 | A1 | * | 2/2005 | Giuliani .................... | 123/52.1 |
| 2005/0076877 | A1 | * | 4/2005 | Sawamura et al. ...... | 123/197.1 |

FOREIGN PATENT DOCUMENTS

JP  11334393 A1 * 7/1999
JP  11-334393 A1  12/1999

\* cited by examiner

*Primary Examiner*—Henry C. Yuen
*Assistant Examiner*—Jason Benton (57) ABSTRACT

In a drive mechanism for a four-cycle engine having an output shaft for outputting the torque of the engine by decelerating the rotation of the crankshaft, the output shaft is placed coaxially with the crankshaft. Intermediate shaft having a driven gear for decelerating the rotation of the crankshaft is placed in parallel with the crankshaft. The rotation of the crankshaft is transmitted to the output shaft through the intermediate shaft.

9 Claims, 7 Drawing Sheets

DRIVE MECHANISM FOR FOUR-CYCLE ENGINE

BACKGROUND OF THE INVENTION

The present invention relates to a structure of a four-cycle engine and, more particularly, to a drive mechanism for a four-cycle engine, which transmits an output of the engine.

Two-cycle engine, which has a relative simple structure and is lightweight, compact, and high-powered, is the mainstream of engines each mounted on a small snow vehicle. However, in recent years, demands for exhaust emission control and improvement of fuel economy against environment problems have promoted the employment of four-cycle engines as those mounted on small snow vehicles.

When employing a four-cycle engine, it is necessary to ensure an output thereof by setting the engine in such a way as to meet high-engine-speed specifications. This is because the four-cycle engine is inferior in output to a two-cycle engine of equal piston displacement. Thus, as shown in Japanese Application Publication Number 11-334393 (especially page 3 or FIG. 1), a drive mechanism for the conventional art four-cycle engine is configured in such a way as to decelerate and transmit power mainly to an output shaft separated from a crankshaft.

Figure 6:
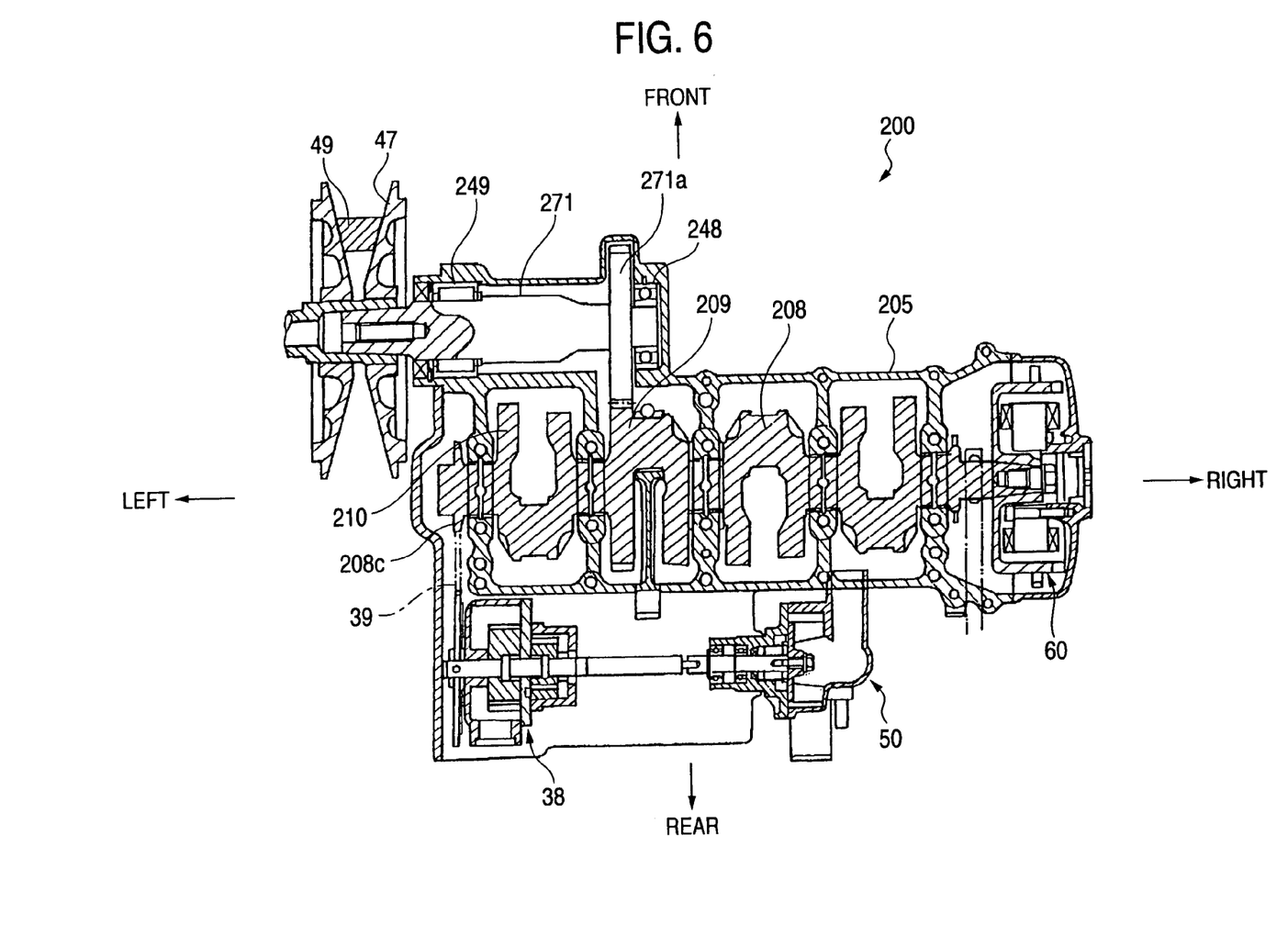
FIG. 6 is a sectional view illustrating the configuration of an engine to be mounted on a conventional art snowmobile.

Four-cycle engine 200, which is mounted on a small snowmobile and has a V-belt type continuously variable transmission as illustrated in FIG. 6, is concretely described as a conventional art engine.

As shown in FIG. 6, the engine 200 is mounted on the small snowmobile so that an axis of a crankshaft 208 is directed along the direction of width of a vehicle body, that is, along the lateral direction. Further, an output shaft 271, to which an output of the engine 200 is transmitted from the crankshaft 208, is disposed in front of the engine 200 in parallel with the crankshaft 208. Drive clutch 47 of the V-belt type continuously variable transmission is disposed at the left end portion of the output shaft 271. Incidentally, reference numeral 49 designates V-belt for power transmission.

In rear of the engine 200, an oil pump 38 and a water pump 50, to which power is transmitted through a chain 39 from a sprocket 208c provided at an end portion (that is, a left end portion) of the crankshaft 208, are coaxially placed, and disposed in parallel with the crankshaft 208.

The separated output shaft 271 is disposed to the side of one of the end portions (that is, the left-end side) of the crankshaft 208. Flywheel magneto 60 is disposed at the other end portion (that is, the right end portion) of the crankshaft 208. The output shaft 271 is rotatably supported in a front projection portion of a crankcase 205 through bearings 248 and 249. Further, a driving force of a crankshaft 28 is transmitted to the output shaft 271 by causing a driven gear 271a, which is provided at an end portion (that is, a right end portion) of the output shaft 271 in the proximity of the center of the crankshaft 208, to mesh with a drive gear 209 provided in a web in the vicinity of the center of the crankshaft 208.

However, according to the aforementioned conventional art configuration, it is necessary for juxtaposing the output shaft 271 and the crankshaft 208 that the output shaft 271 is off-set frontwardly of the engine to a place at which the output shaft 271 does not interfere with a crank web 210, and that the output shaft 271 is journaled in the bearings.

Further, with the aforementioned conventional art configuration, the engine 200 largely projects in a forward-rearward direction or in the direction of width of the vehicle body. Thus, the conventional art has problems in that the center of gravity of the engine become off-set to the front thereof, and that this affects the steering ability of the vehicle.

Figure 7:
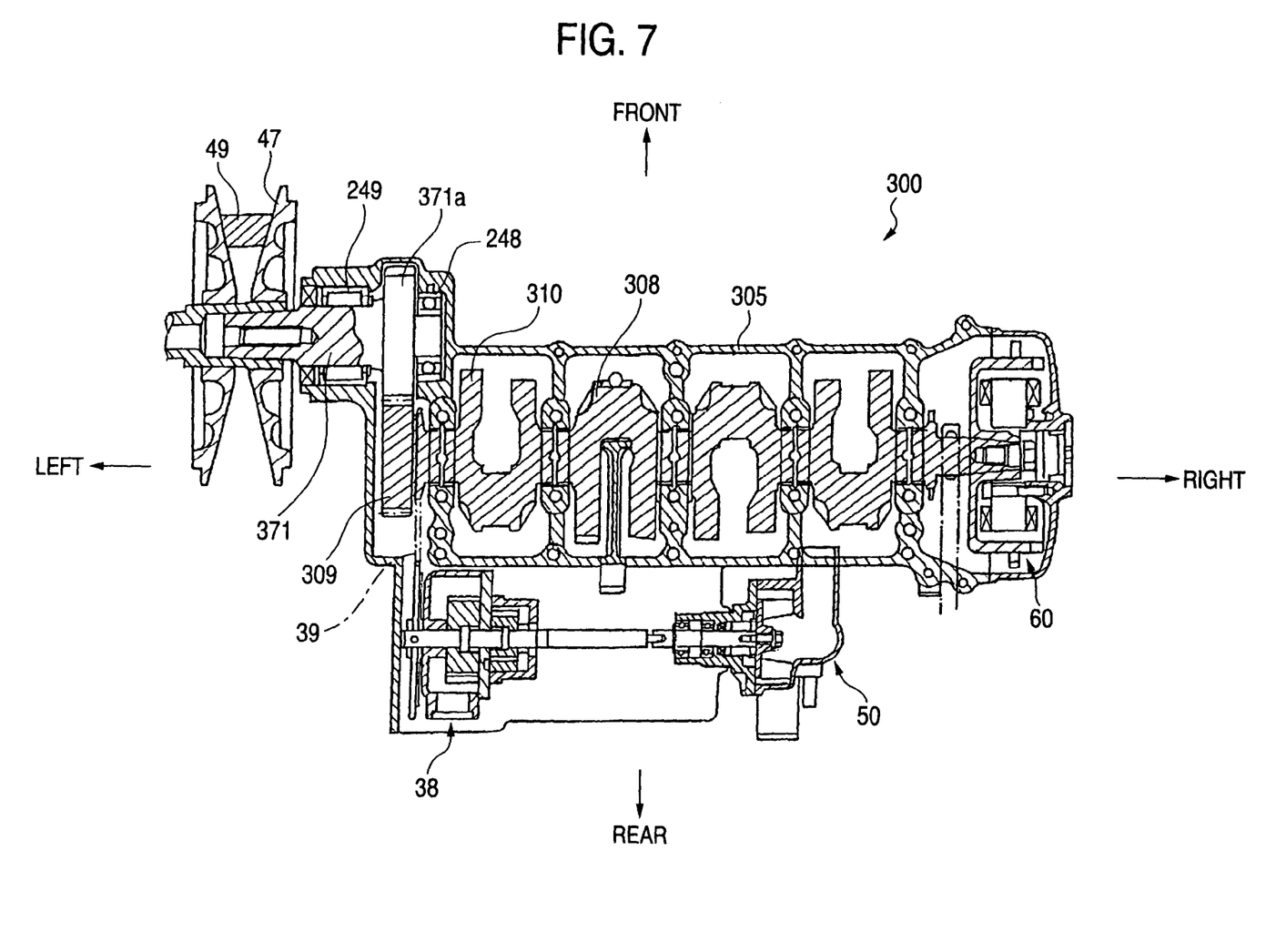
FIG. 7 is a plan sectional view illustrating the configuration of another example of an engine to be mounted on the conventional art snowmobile.

Thus, as in the case of an engine 300 shown in FIG. 7, there has been devised a method for avoiding the interference between an output shaft 371 and a crankshaft 308 by placing the output shaft 371 in such a way as to be deviated in a direction (that is, to the left) from a crank web 310 positioned at one end (that is, at the left end) of the crankshaft 308 so as to reduce a part, in which the crank web 310 and the output shaft 271 interfere with each other, in a crankcase 305. However, this method has a problem in that because the output shaft 371 largely projects to one side, the overall width of the engine is large. Incidentally, reference character 371a designates a driven gear provided at the side of the output shaft 371. Reference numeral 309 denotes a drive gear provided at the side of the crankshaft 308.

Furthermore, because a drive clutch 47 attached to the output shaft 371 is placed at the front portion of the engine 300 and far away from a driven clutch (not shown) provided at a drive side in rear of the engine 300, the length of V-belt 49 is large. Thus, the conventional art has problems in that a space for routing the V-belt 49 is needed, and that the manufacturing cost of the engine increases.

On the other hand, even when the output shaft 371 is disposed in a rear portion of the engine 300, there is the necessity for avoiding the interference between the output shaft 371 and the crankshaft 308 by placing the output shaft 371 in such a way as to be off-set rearwardly of the engine 300 to a place at which the output shaft 371 does not interfere with the crank web 310, or by deviating the output shaft 371 to one side from the crank web 310. Thus, problems similar to those in the case of placing the output shaft 371 at the front portion of the engine 300 occur.

Furthermore, when the output shaft 371 is placed at the rear portion of the engine 300, there is caused the need for moving the engine 300 frontwardly in the vehicle so as to avoid the interference between the output shaft 371 and each of a steering post (not shown) and a heat exchanger (or a cooling unit (not shown)) disposed in rear of the engine 300. Therefore, the conventional art has a problem in that the center of gravity of the engine moves frontwardly, and that this adversely affects the steering ability of the vehicle.

SUMMARY OF THE INVENTION

The invention is accomplished in view of the problems of the conventional art. Accordingly, an object of the invention is to downsize the engine, and to provide a drive mechanism for a four-cycle engine, which offers good steering ability, without frontwardly moving the center of gravity of the engine.

The invention relates to a drive mechanism for a four-cycle engine to be mounted on a compact vehicle, such as a motor cycle or a snowmobile. According to the invention, there is provided a drive mechanism for a four-cycle engine having an output shaft for outputting a rotation driving force of a crankshaft, which is in a decelerated state. The output shaft separated from the crankshaft is placed coaxially with the crankshaft. Intermediate shaft having a reduction gear portion for decelerating and transmitting a rotation driving force of the crankshaft is placed in parallel with the crankshaft. The rotation driving force of the crankshaft is transmitted to the output shaft through the intermediate shaft.

For example, the engine has V-belt type continuously variable transmission. Drive clutch of the V-belt type continuously variable transmission is provided at an end portion of the output shaft which is provided for deceleration and driving and placed coaxially with the crankshaft.

Further, according to the invention, preferably, the intermediate shaft is placed in a crankcase space for accommodating the crankshaft.

Furthermore, according to the invention, it is preferable that the crankcase is split to an upper part and a lower part from a splitting face, that the intermediate shaft is placed on the splitting face of the crankcase, and that the intermediate shaft and the crankshaft are placed on the same plane.

Further, according to the invention, it is preferable that the output shaft is connected to the crankshaft through a bearing, that one of an side end portion of the output shaft and a side end portion of the crankshaft is set to be an outer shaft, that the other is set to be an inner shaft, and that the bearing intervenes between an inner face of the outer shaft and an outer face of an inner shaft, in which the faces are opposed to each other.

Further, according to the invention, preferably, a housing for accommodating the intermediate shaft is provided in a rear and lower portion of the crankcase.

Furthermore, preferably, the drive mechanism of the invention is employed in an engine, which has a V-belt type continuously variable transmission, to be mounted on a snowmobile.

Moreover, preferably, the drive mechanism of the invention is employed in an engine to be mounted on a planing boat.

Further, preferably, a starter motor is placed on an rear portion of said engine the intermediate shaft is placed in a rear portion of the engine and under the starter motor, so that the intermediate shaft is closer to the crankshaft than the starter motor in a side view.

DESCRIPTION OF THE PREFERRED EMBODIMENT

Hereinafter, an embodiment of the invention is described in detail by referring to the drawings.

Figure 1:
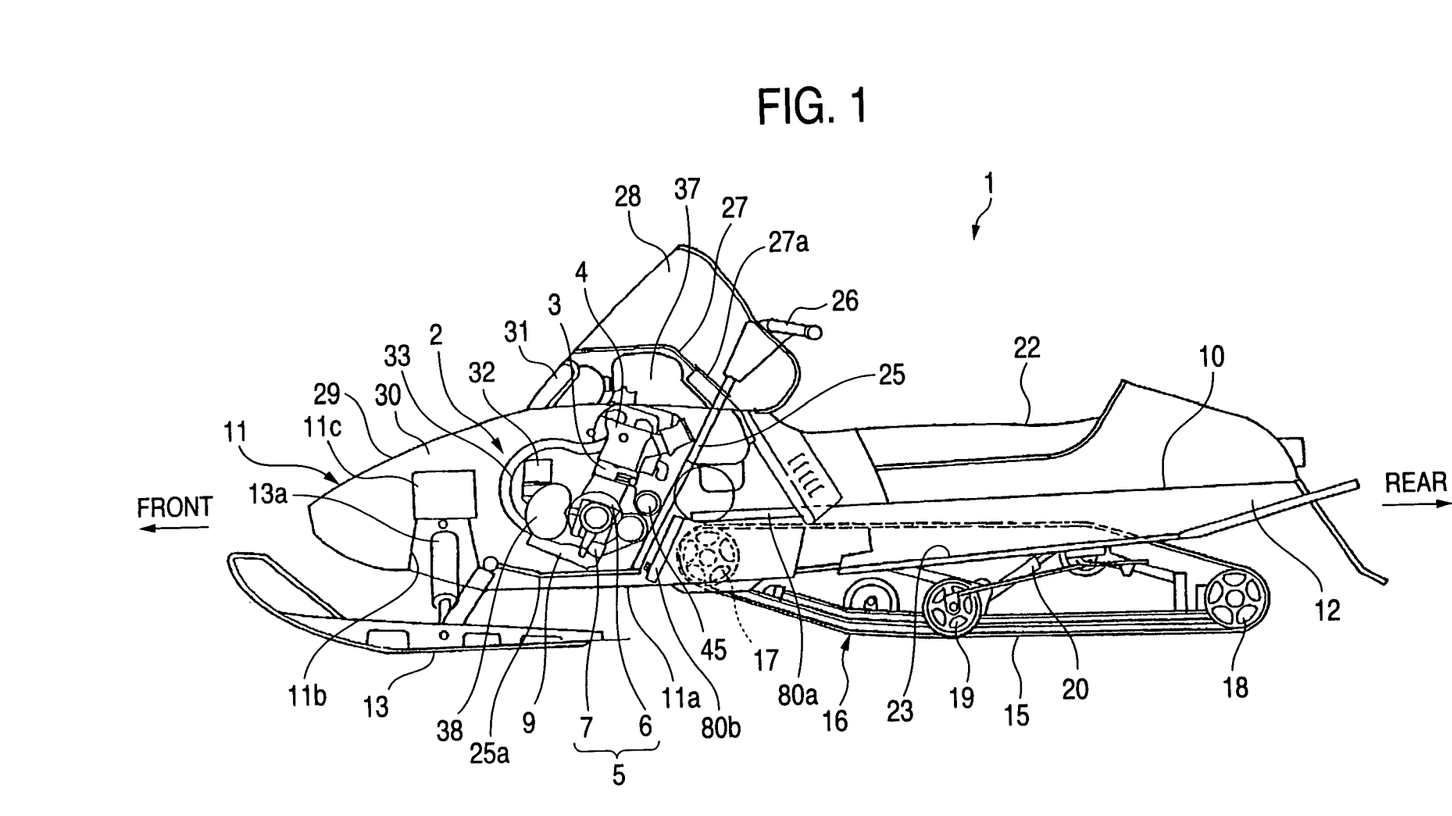
FIG. 1 is a side view illustrating the entire configuration of a snowmobile employing a drive mechanism for a four-cycle engine according to a first embodiment of the invention.
Figure 2:
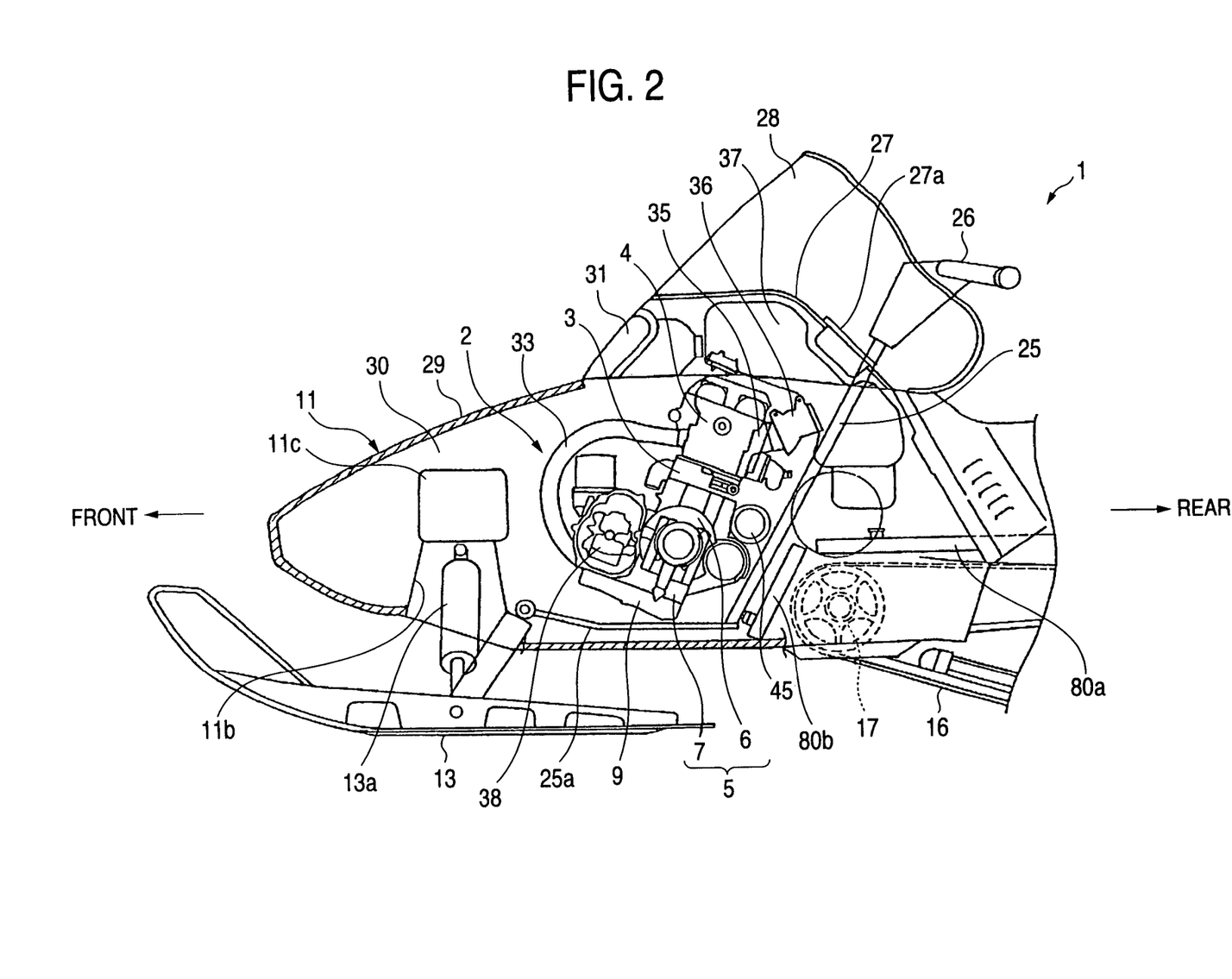
FIG. 2 is a side sectional view illustrating the configuration of a front portion of the vehicle body of the snowmobile.
Figure 3:
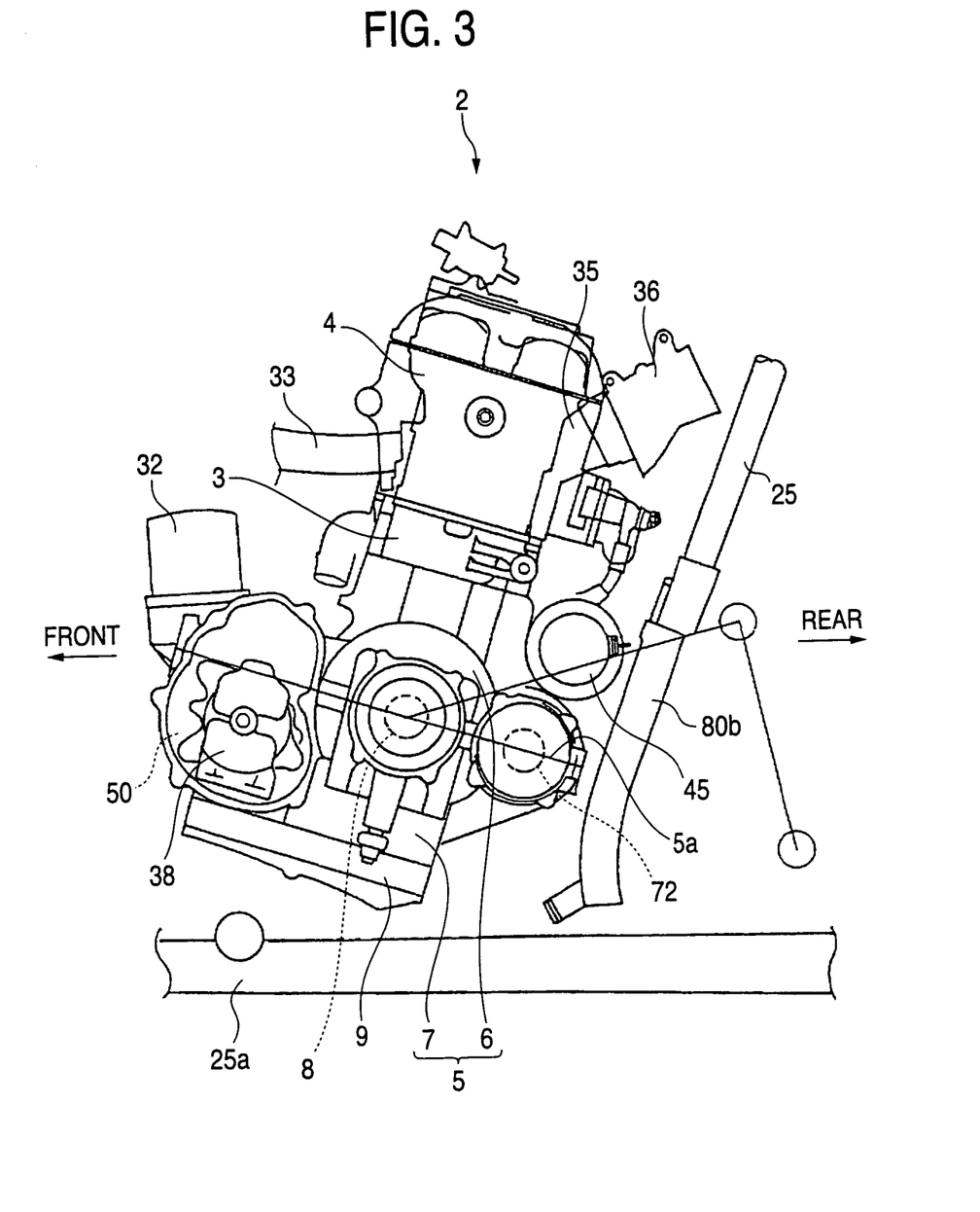
FIG. 3 is a side view illustrating the configuration of the engine according to the embodiment, taken from the left side thereof.
Figure 4:
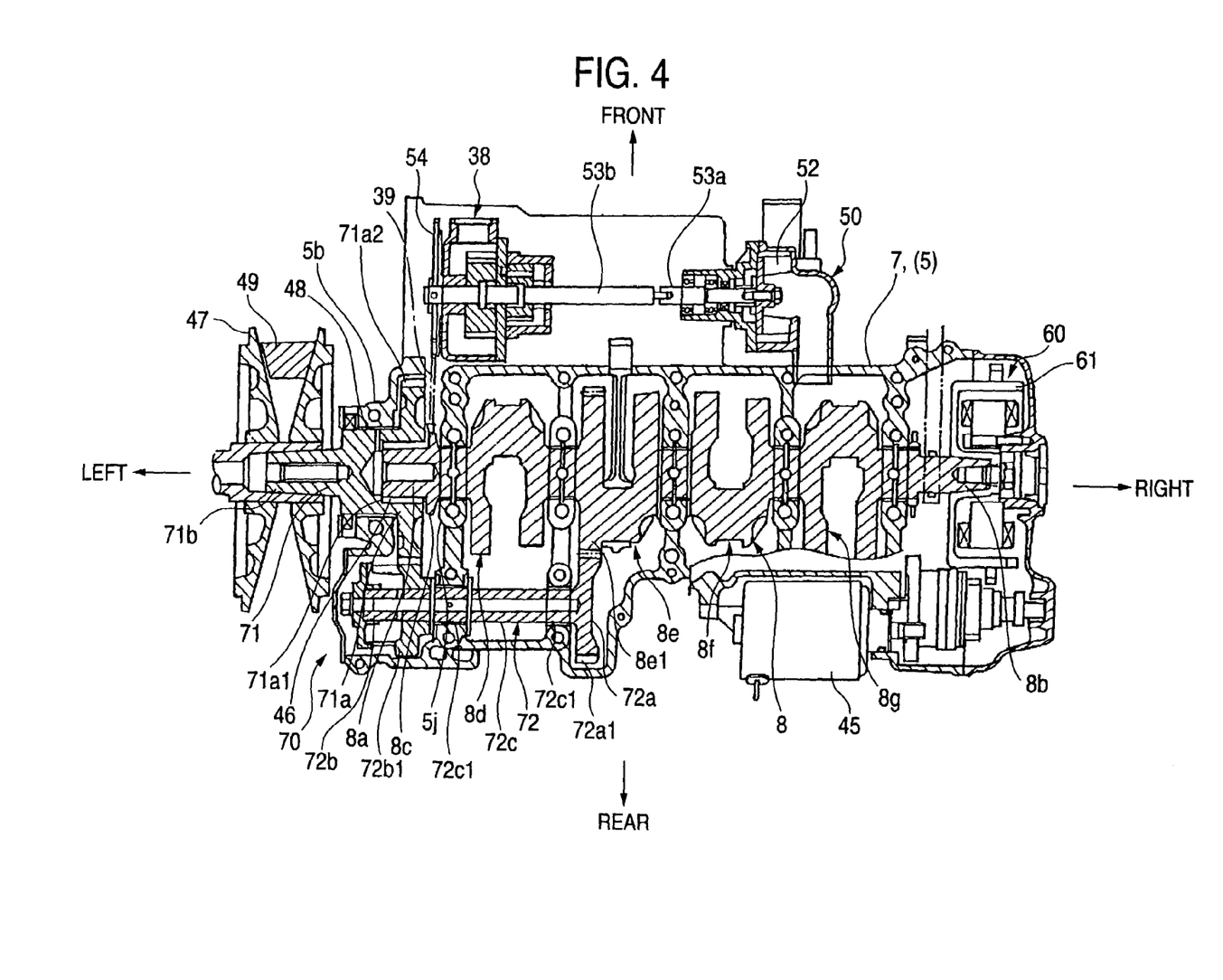
FIG. 4 is a sectional view illustrating the configuration of the engine.

FIGS. 1 to 4 illustrate a first embodiment of a drive mechanism for a four-cycle engine according to the invention. FIG. 1 is a side view illustrating the entire configuration of a snowmobile employing a drive mechanism for a four-cycle engine according to the embodiment of the invention. FIG. 2 is a side sectional view illustrating the configuration of a front portion of the vehicle body of the snowmobile. FIG. 3 is a side view illustrating the configuration of an engine according to this embodiment, taken from the left side thereof. FIG. 4 is a sectional view illustrating the configuration of the engine. In the figures, the same reference character designates the same constituent element.

This embodiment is obtained by constructing a drive mechanism for a four-cycle engine according to the invention in an engine 2 to be mounted on what is called a snowmobile 1 serving as a small snow vehicle.

First, the configuration of the snowmobile 1 according to this embodiment is described hereinbelow.

As shown in FIG. 1, in the snowmobile 1, paired left and right skis 13 is turnably installed in a frame front part (that is, an engine mount frame) 11 of a front portion of a vehicle body of a vehicle body frame 10 extending in a frontward-rearward direction, drive crawler for circulating a track belt 15 is placed at a lower portion of a frame rear part 12 of a rear portion of the vehicle body. The crawler 16 has a drive wheel 17 placed at the front end of a frame rear portion 12, a driven wheel 18 placed at the rear end thereof, a plurality of middle wheels 19, a suspension mechanism 20, and the track belt 15, which circulates by being wound around each wheel.

The vehicle body frame 10 is formed in such a way to have a monocoque frame structure. In the frame front part 11, on which the engine 2 is mounted, a part provided frontwardly of a main part 11a is formed in such a manner as to upwardly project. Moreover, a front suspension housing 11b for accommodating an upper part of a front suspension 13a supporting the steering skis 13 is formed therein.

The frame rear portion 12 is provided in such a way as to extend in the frontward-rearward direction of the vehicle body to the rear end portion, and serves a cover accommodating the entire crawler 16 thereunder. A saddle-like sheet 22 is placed above the frame rear portion 12. Steps 23 are provided on both sides in the direction of vehicle-body-width of the sheet 22 in such a way as to be lower by one level.

A steering post 25 is erected nearly at a central portion of the vehicle body, which is located between the sheet 22 and the frame front part 11. A steering 26 is provided at the top portion of the steering post 25 in such a way as to be slightly and backwardly tilted and as to extend horizontally in a lateral direction. A steering tie-rod 25a for connecting the steering post 25 to the steering skis 13 is attached to the bottom portion of the steering post 25. The steering skis 13 are operated by the steering 26 through the steering post 25.

In the frame front part 11, an instrument panel 27 is provided in the vicinity of and frontwardly of the steering 26 in such a way as to cover an upper portion of the frame front part 11. Measuring meters, such as a speed-meter/tachometer 27a, are attached to the instrument panel 27.

A windshield 28 is erected in such a manner as to surround the frontward and outer circumferential portion of the instrument panel 27 and as to extend from the front to both sides so that the top edge thereof is backwardly tilted. Further, an engine hood 29 is formed at the front side of the instrument panel 27 in such a manner as to be nearly streamlined in a gradual decline from the base of the windshield 28 to the front thereof and as to be shaped nearly like a reversed ship bottom.

The engine hood 29 is provided in front of the instrument panel 27, and formed in such a manner as to extend from a position, which is lower than the front end portion of the instrument panel 27 by one step, to the tip end portion thereof. A headlight 31 for forward illumination is provided at a step-like portion between the engine hood 29 and the instrument panel 27. An engine room 30 is formed under the instrument panel 27 and the engine hood 29, which are provided in this manner.

A heat exchanger (that is, a cooling unit) 80*a* is provided in the engine room 30 in such a way as to face and extend nearly in parallel to the track belt 15 frontwardly and downwardly of the frame rear part 12 and upwardly in the vehicle traveling direction of the crawler 16. A front-side heat exchanger 80*b* is provided in such a way as to face the track belt 15 in front of the front side in the vehicle traveling direction of the crawler 16 in a state in which the top portion of this exchanger is slightly and backwardly tilted. Each of the heat exchangers 80*a* and 80*b* is almost rectangular when seen in a plan view.

Next, the configuration of the engine according to this embodiment is described in detail hereinbelow.

As shown in FIGS. 1 and 2, the engine 2 is placed nearly at a central portion in the engine room 30 formed in the frame front part 11 constructed at the front portion of the vehicle body of the snowmobile 1 and in the proximity of a portion located under the steering post 25 so that a cylinder 3 is tilted backwardly in the traveling direction of the snowmobile (that is, so that the center of a cylinder head 4 located behind a crankshaft 8).

As shown in FIGS. 3 and 4, the engine 2 is a water-cooled four-cycle engine in which four cylinders are placed in parallel in the direction of width of the vehicle body (that is, the crankshaft 8 is placed by being directed in the direction of width of the vehicle body). The engine 2 is placed nearly at the central portion of the vehicle body front part of the snowmobile 1 in a condition in which a part thereof at the side of the cylinder 3 is tilted in the backward direction of the vehicle body.

A cylinder head 4 is provided above the cylinder 3. Exhaust tube (that is, an exhaust pipe) 33 extending to the front of an exhaust port and then turning downwardly to the bottom portion of the engine 2 is provided at a front portion of the cylinder head 4. An oil tank 11*c* is placed frontwardly of the exhaust pipe 33 above the front suspension housing 11*b* formed at the bottom part of the main portion of the frame front part 11.

Intake path including an intake passage 35, a throttle body 36, and an air cleaner box 37 is provided behind the cylinder head 4 frontwardly of the steering post 25, that is, between the body of the engine 2 and the steering post 25.

The intake passage 35 is placed at a position higher than the cylinder head 4, and constituted by a "downdraft system" according to which air supplied to an intake port (not shown) is blown down from above, and juxtaposed with the steering post 25.

A part of the intake path including the throttle body 36 is placed a position higher than the cylinder head 4, and placed in a space within the engine room 30 formed behind the headlight 31 under the instrument panel 27 above the engine 2.

As illustrated in FIGS. 3 and 4, a crankcase 5 is provided under the cylinder 3. The crankcase 5 is constituted by employing a split construction that has a crankcase upper-part 6, which integrally constitute the cylinder 3, and a crankcase lower-part 7. In the crankcase 5, the crankshaft 8 is placed almost in parallel with the direction of width of the vehicle body. An oil pan 9 is provided under the crankcase lower-part 7 in a state in which the oil pan 9 is placed in the vicinity of the bottom portion of the engine room 30.

A starter motor 45 is placed behind the cylinder 3 and under the intake passage 35 on the right side in the direction of vehicle body width rearwardly of the crankcase 5. That is, the starter motor 45 is placed rearwardly of the crankshaft 8. Further, a flywheel magneto 60 is provided on the right-side wall of the crankcase 5 in such a way as to be concentrically with the crank shaft 8.

A water pump 50 is disposed at a place nearly opposed to the starter motor 45 across the cylinder 3 under the exhaust pipe 33. That is, the water pump 50 is disposed frontwardly of the crank shaft 8.

Oil pump 38 is provided on the left side in the direction of vehicle body width frontwardly of the crankcase 5 concentrically with the water pump 50 nearly in parallel with the crankshaft 8. Oil filter 32 for cleaning oil in the crankcase 5, which is obtained by sucking out oil (that is, lubrication oil) from the oil pan 9 by the oil pump 38, by letting the oil through an interpolation oil filter member is provided above the oil pump 38 in such a manner as to upwardly project. The oil having been let through the oil filter 32 is supplied to each part of the engine.

The water pump 50 has a fin 52 of an impeller for feeding coolant water into the engine, and also has a rotation shaft 53*a* for driving the fin 52.

The rotation shaft 53*a* is provided in such a way as to be integral with the fin 52. Moreover, the rotation shaft 53*a* is concentrically and integrally connected to a rotation shaft 53*b* of the oil pump 38, and provided nearly in parallel to the crankshaft 8. That is, the rotation shaft 53*b* of the oil pump 38 is provided nearly in parallel to the crankshaft 8, together with the rotation shaft 53*a* of the water pump 50.

Drive sprocket 54 is provided at the other end (that is, the left end) of the rotation shaft 53*b* in such a way as to be integral therewith. The sprocket 54 is provided at an axial position, which is and equal to that of the drive sprocket 8*c* provided at the other end (that is, the left end) of the crankshaft 8, in such a manner as to be opposite to the drive sprocket 8*c*. Chain 39 is looped over the sprocket 54 and the sprocket 8*c*, so that the sprocket 54 is connected to the sprocket 8*c* through the chain 39.

The sprocket 8*c* is formed between a journal 5*j* provided to the right-side wall of the crankcase among a plurality of journals, by which the crankshaft 8 is rotatably journaled, and an output shaft 71 (to be described later), into which the other end (that is, the left end) 8*a* of the crankshaft 8.

With the aforementioned configuration, when the engine is operated, the crankshaft 8 rotates, so that the rotation shaft 53*b* performs the rotation driving of the rotation shaft 53*a* through the sprocket 8*c*, the chain 39, and the sprocket 54. Rotation of the rotation shaft 53*b* activates the oil pump 38. The rotation driving of the rotation shaft 53*a* causes the fin 52 of the water pump 50 to rotate and discharge coolant water. Thus, the coolant water is supplied to a water jacket (not shown), which is formed in the engine, through a coolant water passage (not shown) to thereby refrigerate the engine 2.

As shown in FIG. 4, the crankshaft 8 is provided in the crankcase 5 in such a way as to extend along the direction of vehicle body width. This crankshaft 8 has an end (that is, the right end) 8*b*, to which a rotor portion 61 of the flywheel magneto 60 is attached, and also has the other end (that is, the left end) 8*a*, at which an output shaft 71 coaxially constituting a drive mechanism 70 through a roller bearing 46 is rotatably journaled.

Further, the crankshaft 8 is such that crank webs 8*d*, 8*e*, 8*f*, and 8*g* (sequentially placed from the left to the right) are integrally provided at positions respectively opposed to four gas-columns (to be respectively numbered to #1 thru #4 from the left to the right, as viewed in this figure) formed in the cylinder 3 in such a way as to have predetermined rotation angle positions. Primary gear 8e1 is formed as a gearing portion on and over the entire outer circumferential portion of the crank web 8e.

The primary gear 8e1 meshes with a driven gear 72a1 of an intermediate shaft 72 (to be described later) of the drive mechanism 70, and transmits a driving force thereto.

Concave fitting portion (that is, an example of an outer shaft) is formed in an end (that is, the right end) 71a of the output shaft 71 so that the crankshaft 8 can be fitted thereinto. Roller bearing 46 is mounted in the fitting portion 71a1. That is, the spacing between the inner surface of the concave fitting portion 71a1 and the outer surface of the other end 8a of the crank shaft 8 has a uniform distance. The roller bearing 46 is provided in the space.

Further, a driven gear 71a2 meshing with a drive gear 72b1 of the intermediate shaft 72 (to be described later) is formed on the outer circumferential edge of an end 71a.

Drive clutch (that is, a movable drive face) 47 of V-belt type continuously variable transmission (not shown) is attached to the other end (that is, the right end) 71b of the output shaft 71.

The output shaft 71 has an end (that is, the right end) 71a journaled on the outer circumference of the other end (that is, the right end) 8a (that is, an outer shaft) of the crankshaft 8 through the roller bearing in the crankcase 5. Outer circumferential portion in the vicinity of the output shaft 71 is journaled by a cylindrically projecting portion 5b of the left-side wall of the crankcase 5 through a metal bearing 48. The output shaft 71 is provided in such a way as to have the other end (that is, the left end) 71b that protrudes outwardly of the crankcase 5 as a free end.

As shown in FIGS. 3 and 4, the intermediate shaft 72 is provided in parallel with the axial direction of the crankshaft 8 in the rear side of the engine and in the crankcase 5. The intermediate shaft 72 and the crankshaft 8 are placed on the same plane that is a splitting face 5a between the crankcase upper-part 6 and the crankcase lower-part 7. Further, the intermediate shaft 72 is placed to the left in the direction of vehicle body width under the starter motor 45.

On an end (that is, the right end portion) of the intermediate shaft 72, a driven gear 72a1 meshing with a primary gear 8e1 of the crank web 8e is provided. On the other end (that is, the left end) 72b thereof, a drive gear 72b1 meshing with the driven gear 71a2 of the output shaft 71 and transmitting a driving force thereto is formed in such a way as to be integral therewith.

Incidentally, each of the gears 72a1 and 72b1 of the intermediate shaft 72 may be formed separately from the intermediate shaft 72 and fixed integrally.

Moreover, the intermediate shaft 72 is adapted so that a shaft part 72c thereof, which is provided between the driven gear 72a1 and the drive gear 72b1, is rotatably journaled on the crankcase 5 through the metal bearing 72c1.

Next, an operation of the drive mechanism 70 of the four-cycle engine according to this embodiment is described hereinbelow.

Output from the crankshaft 8 owing to an operation of the engine 2 is transmitted from the primary gear 8e1 of the crank web 8e by being decelerated by the driven gear 72a1 of the intermediate shaft 72. At that time, the intermediate shaft 72 rotates in a direction opposite to that of rotation of the crankshaft 8.

Furthermore, the output transmitted to the intermediate shaft 72 is transmitted from the drive gear 72b1 by being decelerated by the driven gear 71a2 of the output shaft 72.

At that time, the output shaft 71 rotates in a direction reverse to the direction of rotation of the intermediate shaft 72. That is, the output shaft 71 rotates in a direction equal to the direction of rotation of the crankshaft 8.

Therefore, the output from the crankshaft 8 is more decelerated through the intermediate shaft 72 and the output shaft 71, and results in large torque, which can be outputted from the output shaft 71 to the V-belt type continuously variable transmission so that the direction of rotation thereof is the same as the direction of rotation of the crankshaft 8, and that the output shaft 71 and the crankshaft 8 are coaxial with each other.

With the aforementioned configuration, according to the drive mechanism 70 of a four-cycle engine of this embodiment, a driving force can be transmitted coaxially with the crankshaft 8 without largely protruding the crankcase 5. Thus, the reduction in size and weight of the engine can be achieved. Moreover, because the center of gravity of the engine is not moved forwardly, the engine excelling in steering ability can be realized.

Furthermore, according to this embodiment, the drive mechanism 70 for a four-cycle engine comprises two axes, that is, the output shaft 71 and the intermediate shaft 72. Thus, a transmission rate, at which an output from the engine 2 to the output shaft is performed by performing two-step reduction, so that large torque can be obtained. Additionally, a driving force can be transmitted by rotating these shafts in a direction of rotation thereof, which is the same direction of rotation of the crankshaft 8.

Further, according to this embodiment, the transmission of a driving force from the crankshaft 8, the intermediate shaft 72, and the output shaft 71 by the drive mechanism 70 for a four-cycle engine is achieved by a method utilizing the mesh between the gears. Thus, this embodiment realizes the layout of a space-saving engine of a simple configuration.

Moreover, according to this embodiment, the output shaft 71 is placed coaxially with the crankshaft 8. Thus, the necessary length of V-belt installed in a snowmobile can be reduced. Thus, the cost can be decreased. Consequently, the commonization of V-belt among this embodiment and existing structures can be achieved.

Further, according to this embodiment, the roller bearing 46 is used in the bearing portion between the output shaft 71 and the crankshaft 8. On the other hand, the metal bearing 48 is used in the bearing portion between the output shaft 71 and the crankcase 5. Thus, the size of the housing portion can be reduced. The weight of the engine can be reduced.

Moreover, according to this embodiment, the intermediate shaft 72 is provided in the crankcase 5. Thus, a space-saving drive mechanism for a four-cycle engine, which has parts of a small number, can be constituted without separately providing a peculiar case.

Furthermore, according to this embodiment, the intermediate shaft 72 can be provided in the splitting face 5a in the crankcase 5 so that the intermediate shaft 72 and the crankshaft 8 are mounted on the same plane. Thus, the crankcase 5 can be formed in such a manner as to have a simple shape. Consequently, the productivity thereof can be enhanced. Moreover, the assemble workability can be improved.

Further, according to this embodiment, the intermediate shaft 72 is configured at a position, at which the intermediate shaft 72 does not interfere with the starter motor 45, and the intermediate shaft 72 is set to be closer to the crankshaft 8 than the starter motor 45 when viewed in a side view. Thus, the engine can be mounted in such a way as to be close to the center of the vehicle body. Consequently, the steering ability of the vehicle can be improved.

Moreover, according to the embodiment, the primary gear 8e1 is configured in such a way as to be integral with the outer circumferential portion of the crank web 8e of the crank shaft 8. Output thereof is transmitted by the mesh between gears. Thus, the layout of a space-saving engine of a simple part configuration can be achieved without separately constructing a transmission gear.

Incidentally, although the intermediate shaft 72 of the drive mechanism 70 for a four-cycle engine is placed on the splitting face 5a of the crankcase 5 in the embodiment so that the intermediate shaft 72 and the crankshaft 8 are placed on the same plane. However, the invention is not limited to such a method of mounting the intermediate shaft. For instance, a modification of this embodiment may be provided so that, and that a housing for accommodating the intermediate shaft is provided behind and under the crankcase.

Hereinafter, a second embodiment (that is, a modification of the drive mechanism for a four-cycle engine according to the first embodiment) is described by referring to the accompany drawings.

Figure 5:
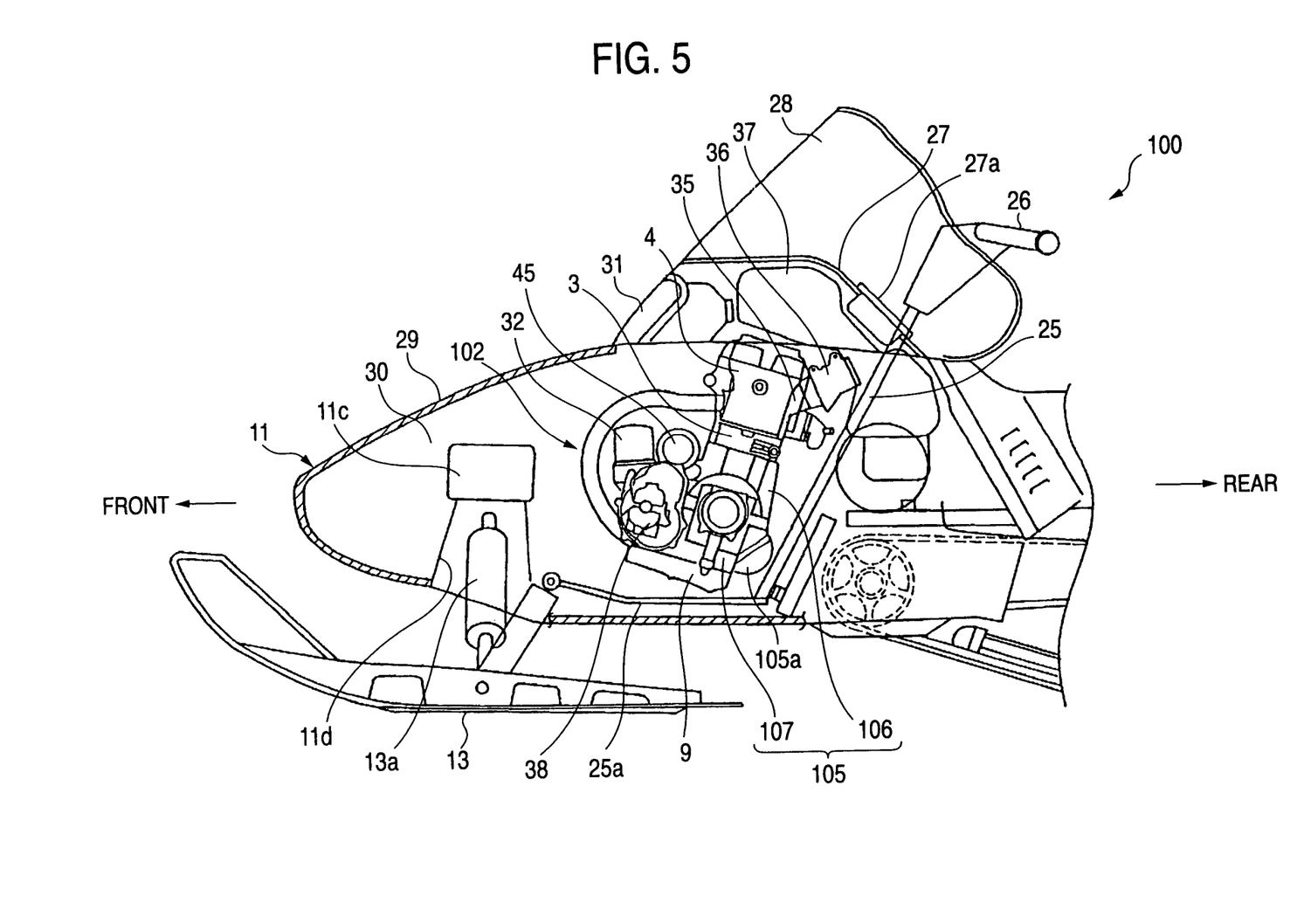
FIG. 5 is a side sectional view illustrating the configuration of an engine in the case of a modification of the drive mechanism for a four-cycle engine according to a second embodiment.

FIG. 5 is a side sectional view illustrating the configuration of an engine, according to the second embodiment. In this figure, a portion designated by a reference character, which is the same character as used for designating a constituent element in the figures illustrating the aforementioned embodiment, is the same as the constituent element. Therefore, the description of such a portion is omitted.

The configuration of a snowmobile of the second embodiment is similar to that of the snowmobile 1 of the first embodiment having a large number of constituent elements have been aforementioned.

As illustrated in FIG. 5, an engine 102 of the second embodiment is configured so that a nearly central portion of an engine room 30 formed in a frame front portion 11 configured a front portion of the vehicle body of the snowmobile 100 so that the cylinder 3 is tilted backwardly in the direction of travel of the snowmobile (that is, the center of the cylinder head 4 is located backwardly of the crankshaft 8) so that the engine 102 is close to a portion located under the steering post 25.

Crankcase 105 is provided under the cylinder 3 that is located under the cylinder head 4. The crankcase 5 is configured by employing a splitting structure having a crankcase upper-part 106 formed integrally with the cylinder 3 and a crankcase lower-part 107. Under the crankcase lower-part 107, an oil pan 9 is provided in such a state to be close to the bottom portion of the engine room 30.

Starter motor 45 is placed upstream of and under an exhaust pipe 33, frontwardly of the cylinder 3, and frontwardly of and at the right side in the direction of vehicle body width of the crank case upper-part 106.

In a part, which is located behind the engine, of the crankcase lower-part 107, a housing 105a is separately formed by being directed rearwardly and obliquely downwardly.

The housing 105a is formed so that the housing 105a projects like a semi-circle when seen in a side view thereof, and that the housing 105a covers the intermediate 72, which is located behind and under the crankshaft 8 and provided in parallel to the crankshaft 8.

With the aforementioned configuration, according to the second embodiment, the intermediate shaft 72 is placed behind and under the crankshaft 8. Thus, the housing 105a can be configured without largely projecting the housing 105a rearwardly of the crankcase lower-part 107. Further, the starter motor 45 is placed frontwardly of the crankcase upper-part 106, so that the engine 102 can be mounted in such a manner as to be close to the steering post 25. Thus, the center of gravity of the engine can be made to be close to the center of the engine. Consequently, the steering ability thereof can be enhanced.

Incidentally, although the engine mounted on the snowmobile has been described by way of example in the description of the aforementioned embodiments, the invention is not limited to the configuration and the constituent parts of the engine. Needless to say, various modifications can be made without departing from the spirit of the invention.

For example, the invention may be applied to an engine to be mounted on a planing boat. In such a case, the output shaft of the drive mechanism for a four-cycle engine can be configured coaxially with the crankshaft. Thus, the engine can be mounted thereon with good balance. The helm ability can be improved.

Further, the invention can be developed in another vehicle such as a motorcycle.

As described above, the invention can achieves that the drive mechanism for a four-cycle engine reduces the size and weight, and realize a drive mechanism for a four-cycle engine excels in steering ability without moving the center of gravity of the engine.

Particularly, according to the invention, there is provided a drive mechanism for a four-cycle engine to be mounted on a compact vehicle, such as a motor cycle or a snowmobile. Output shaft separately from a crankshaft of the drive mechanism is provided coaxially with the crankshaft. Intermediate shaft having a reduction gear portion for transmitting a rotation driving force of the crankshaft by reducing the rotation driving force is provided in parallel with a crankshaft. The rotation driving force of the crankshaft is transmitted to the output shaft through the intermediate shaft to thereby place the output shaft without projecting the output shaft in a direction along an axis line of the crankshaft of the engine. Thus, the center of gravity of the engine is not set to the front thereof. Consequently, the steering ability thereof can be enhanced. As compared with the related art engine, the engine according to the invention can be down-sized.

Further, according to the invention, the intermediate shaft is placed in a crankcase space for accommodating the crankshaft. Thus, the intermediate shaft can be placed without separately providing a dedicated case. Consequently, the engine can be constituted by a small number of parts.

Furthermore, according to the invention, the crankcase is divided into an upper-part and a lower-part, which are located upwardly and downwardly from a splitting face. The intermediate shaft is placed on a crankcase splitting face so that the intermediate shaft and the crankshaft are placed on the same plane. Thus, the shape of the crankcase can be simplified. The assemble ability of the intermediate shaft can be enhanced.

Moreover, according to the invention, the output shaft is connected to the crankshaft through a bearing. One of a side end portion of output shaft and a side end portion of crankshaft is set to be an outer shaft. The other thereof is set to be an inner shaft. The bearing is provided between an inner surface of the outer shaft and an outer surface of the inner shaft, which is opposed to the inner surface of the outer shaft. This eliminates the necessity for providing a bearing portion, which is dedicated to the output shaft, in the crankcase. Thus, the drive mechanism can be configured in such a way as to be space-saving without setting the size of the crankcase to be larger than a required size thereof.

Further, according to the invention, by locating the housing for accommodating the intermediate shaft behind and under the crankcase, only the housing is attached thereto and detached therefrom without decomposing a crankcase body. Consequently, the assemble ability of the intermediate shaft and the workability of the maintenance work can be enhanced.

Furthermore, according to the invention, the drive mechanism of the invention is employed in an engine that is mounted on a snowmobile and that has a V-belt type continuously variable transmission. Thus, a space-saving engine is realized. The engine can be configured without moving the center of gravity of the engine to the front thereof. Consequently, the steering ability can be improved.

Moreover, according to the invention, the drive mechanism of the invention is employed in an engine to be mounted on a planing boat. Thus, the output shaft can be configured coaxially with the crankshaft. Thus, the engine can be mounted in such a way as to be well-balanced. The helm ability thereof can be improved.

Furthermore, according to the invention, the intermediate shaft is placed in a rear portion of the engine and under the starter motor, so that the intermediate shaft is closer to the crankshaft than the starter motor in a side view. Thus, the intermediate shaft can be installed without largely and rearwardly projecting the crankcase. Consequently, the drive mechanism of the invention has excellent advantages in that when the engine is mounted on a snowmobile in which the engine is accommodated in a narrow vehicle-front-side space, the center of gravity of the engine is not moved to the front thereof, and the engine can be mounted without interfering with the steering post.

What is claimed is:

1. A drive mechanism for a four-cycle engine, comprising:
    a crankshaft;
    an output shaft for outputting a rotation driving force in decelerated state from an original rotation of the crankshaft, separated from the crankshaft and placed coaxially with the crankshaft, and
    an intermediate shaft having a reduction gear for decelerating and transmitting a rotation driving force of the crankshaft, placed in parallel with the crankshaft,
    wherein the rotation driving force of the crankshaft is transmitted to the output shaft through the intermediate shaft.

2. A drive mechanism for a four-cycle engine according to claim 1, wherein the intermediate shaft is placed in a crankcase space for accommodating the crankshaft.

3. A drive mechanism for a four-cycle engine according to claim 1, wherein the crankcase is split to an upper part and a lower part on a splitting face, and the intermediate shaft is placed on the splitting face of the crankcase on a same plane with the crankshaft.

4. A drive mechanism for a four-cycle engine according to claims 1,
    wherein the output shaft is connected coaxially to the crankshaft through a bearing,
    one of a side end portion of the output shaft and a side end portion of the crankshaft is set to be an outer shaft, the other is set to be an inner shaft, and
    the bearing is provided between an inner face of the outer shaft and an outer face of the inner shaft.

5. A drive mechanism for a four-cycle engine according to claim 1, wherein a housing for accommodating the intermediate shaft is placed in a rear and lower portion of the crankcase.

6. A drive mechanism for a four-cycle engine according to claim 1, wherein a V-belt type continuously variable transmission is mounted on the engine and the engine is mounted on a snowmobile.

7. A drive mechanism for a four-cycle engine according to claim 6,
    wherein a starter motor is placed on an rear portion of the engine, and
    the intermediate shaft is placed in a rear portion of the engine and under the starter motor, so that said intermediate shaft is closer to the crankshaft than the starter motor in a side view.

8. A drive mechanism for a four-cycle engine according to claim 1, wherein the engine is mounted on a planing boat.

9. A drive mechanism for a four-cycle engine according to claim 8,
    wherein a starter motor is placed on an rear portion of the engine, and
    the intermediate shaft is placed in a rear portion of the engine and under the starter motor, so that said intermediate shaft is closer to the crankshaft than the starter motor in a side view.

* * * * *